No. 753,372. Patented March 1, 1904.

UNITED STATES PATENT OFFICE.

ANATOLE DENGUINE AND SAMUEL LEVINSOHN, OF GENEVA, SWITZERLAND.

PROCESS OF MAKING CONDENSATION PRODUCTS FROM DICARBO ACIDS AND BROMATED PHTALIC ACIDS WITH NAPHTOLS.

SPECIFICATION forming part of Letters Patent No. 753,372, dated March 1, 1904.

Application filed June 5, 1903. Serial No. 160,184. (No specimens.)

*To all whom it may concern:*

Be it known that we, ANATOLE DENGUINE and SAMUEL LEVINSOHN, subjects of the Czar of Russia, residing in Geneva, in the Republic of Switzerland, have invented certain new and useful Improvements in Processes of Making Condensation Products from Dicarbo Acids and Bromated Phtalic Acids with Naphtols, of which the following is a specification.

It is well known that dicarbo acids form with phenols condensation products which belong mainly to the group of phtaleins. The production of anthracene derivatives in this manner is connected with considerable difficulty, and these difficulties are greatly increased in the production and isolation of the corresponding benzoylbenzoic acids or their homologues. A more favorable result is obtained by the use of naphtols and boric acid as the condensation medium. It is possible to obtain in this manner, for instance, by the use of phtalic acids, naphtacen derivatives when the resulting oxynaphtolybenzoic acids which are obtained by the condensation are treated, for instance, with sulfuric acid. The condensation products can be used as such, and they can be used directly for other products; and for this purpose the invention consists of a process of producing the condensation products from dicarbo acids and bromated phtalic acid bromids with naphtols by melting dicarbo acids and bromated phtalic acid with naphtols in presence of boric acid and then isolating the acids thus obtained or converting them by means of sulfuric acid into the corresponding oxynaphtacenchinons or bromated oxynaphtacenchinons, as will be fully described hereinafter, and finally pointed out in the claims.

*Example I. Oxynaphtoylpropionic acid.—* Ten kilograms of amber acid are carefully mixed with thirty kilograms of crystallized boric acid by intimately mixing the same and then heated to 140° centigrade for some time on an oil-bath provided with a stirring device, after which 12.5 kilograms (one molecule) of alphanaphtol which has been intimately mixed with the same quantity, by weight, of boric acid is added. This mixture is then heated for some time up to a temperature of 140° to 180° centigrade until the mass liquefies. The melt is then permitted to cool and washed several times with hot water for removing the excess of boric acid. The residue is dissolved in a solution of sodium carbonate and decomposed by hydrochloric acid. The oxynaphtoylpropionic acid is then separated by crystallization.

*Example II. Oxynaphtoylbenzoic acid.—* Ten kilograms of phtalic acid anhydrid are intimately mixed with thirty kilograms of crystallized boric acid and heated on the oil-bath at a temperature of about 160° centigrade until the mass is nearly liquid. To this mass is added a mixture of ten kilograms of alpha-naphtol with ten kilograms of boric acid, both being mixed and heated under frequent stirring to 160° to 180° centigrade until the melt is quite liquid, care being taken that as small a quantity as possible of the substances are evaporated. The melt is then permitted to cool, either directly or by suitable cooling means, and after it is cooled it is washed several times with hot water to remove the excess of boric acid, the oxynaphtoylbenzoic acid being crystallized after drying by means of benzene.

*Example III. Oxynaphtoyloxybenzoic acid.—*One kilogram of oxyphtalic acid is heated up with three kilograms of boric acid, after which in the manner before described the properly-computed quantity of alpha-naphtol is added and heated to 180° to 240° centigrade until the melt liquefies. After cooling the melt is saturated with carbonic acid in alkaline solution agitated with ether and the remaining alkaline solution decomposed by hydrochloric acid. (The ether dissolves the substances which have not entered into reaction, also the gummy products.) The new substance is then dried and separated by crystallization.

*Example IV. Trioxynaphtoylbenzoic acid.—*1.4 kilograms of phtalic acid are mixed as before described, and condensed with a computed quantity of trioxynaphtolinsulfonic acid, beta, beta, alpha, (1.7 kilograms,) after which the acid is isolated by any one of the methods before mentioned.

*Example V. Dibromoxynaphtoylbenzoic acid.*—Dibromoxynaphtoylbenzoic acid is prepared as before described. The isolation is accomplished by treatment with hot water, as the acid is almost insoluble in water. As the starting substance is dibromophtalic acid, bromin is present in the benzene nucleus.

*Example VI. Tribromoxynaphtoylbenzoic acid.*—Tribromophtalic acid is condensed with alpha-naphtol and the acid, as before described, isolated with hot water.

*Example VII. Tetrachloroxynaphtoylbenzoic acid.*—The tetrachlorophtalic acid yields by the method heretofore described the tetrachloroxynaphtoylbenzoic acid.

The conversion of the oxinaphtoylbenzoic acids into the corresponding oxynaphtacenchinons is produced by heating the pulverized melts directly (in case the isolation of the acids is connected with difficulty) or the isolated acids (in which case the same quantity of boric acid is added) with concentrated or fuming sulfuric acid at about 160° centigrade for some time.

The condensation products obtained are used in the production of dyestuffs.

Having thus described our invention, we claim as new and desire to secure by Letters Patent—

1. The process herein described of producing condensation products from dicarboacids and bromated phtalic acids with naphtols, which consists in melting dicarboacids and bromated phtalic acids with naphtols in presence of boric acid, and then directly isolating the corresponding acids, substantially as set forth.

2. The process herein described of producing condensation products from dicarboacids and bromated phtalic acids with naphtols, which consists in melting dicarboacids and bromated phtalic acids with naphtols in presence of boric acid, and then converting the acids thus obtained by means of sulfuric acid into the corresponding respectively bromated oxynaphtacenchinons, substantially as set forth.

In testimony that we claim the foregoing as our invention we have signed our names in presence of two subscribing witnesses.

ANATOLE DENGUINE.
SAMUEL LEVINSOHN.

Witnesses:
THEODORE ELJORDOFF,
L. H. MUNIER.